Nov. 11, 1958 G. L. HITZ 2,859,870
PULL PRESS FOR UP-SETTING PIPE OPENINGS
Filed July 25, 1955 2 Sheets-Sheet 1
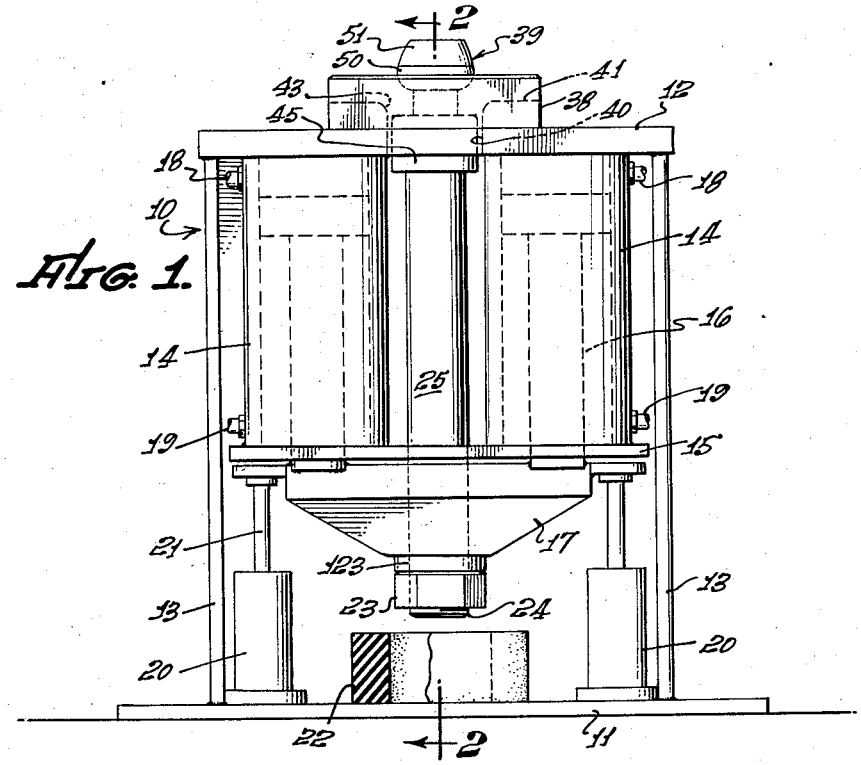
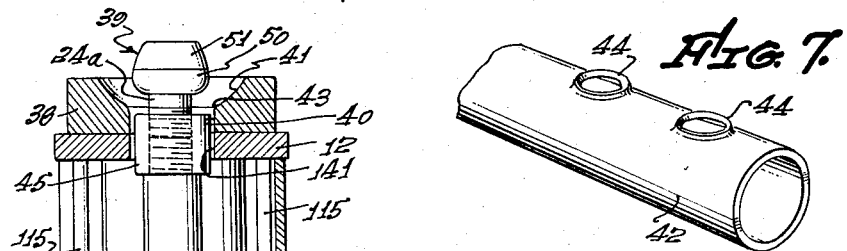
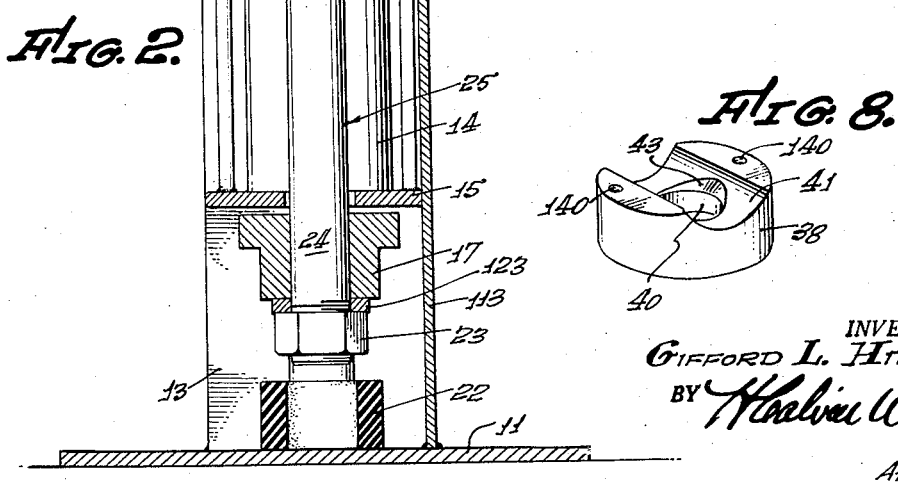
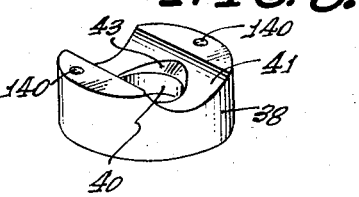
INVENTOR.
GIFFORD L. HITZ,
BY
ATTORNEY.

Nov. 11, 1958 G. L. HITZ 2,859,870
PULL PRESS FOR UP-SETTING PIPE OPENINGS
Filed July 25, 1955 2 Sheets-Sheet 2

INVENTOR.
GIFFORD L. HITZ,
BY
ATTORNEY.

United States Patent Office 2,859,870
Patented Nov. 11, 1958

2,859,870

PULL PRESS FOR UP-SETTING PIPE OPENINGS

Gifford L. Hitz, Paola, Kans., assignor to The Fluor Corporation, Ltd., Los Angeles, Calif., a corporation of California Application July 25, 1955, Serial No. 524,011

5 Claims. (Cl. 207—19)

This invention relates generally to apparatus for forming flanges in pipes, pressure vessels and similar bodies, and more particularly has to do with a novel metal extrusion press capable of cold extruding metal wall portions surrounding pre-cut openings in pipes to form flanges projecting outwardly from the curved metal pipe walls, providing annular connections to which the ends of branch pipes may be readily joined.

When two pipes are to be joined together in intersecting relation, as for example when the end of a branch pipe or nozzle is to be connected into the curved wall of a header pipe, it is often necessary to provide a rigid and permanent connection therebetween capable of withstanding relatively high fluid pressure. Such connections for pipes and pressure vessels find wide application and utility in the general field of gas transmission and especially as regards gas pumping stations where header pipes and branch lines must necessarily be connected.

Taking the practice for joining branch lines to header pipes as representative of past development, it has been common to weld a separate T into the header for connection to the branch line, or to contour weld the end of a branch line directly to the curved metal wall of the header pipe surrounding the pre-cut opening therein to form what is commonly known as a "stubbed-in" connection. Both of these methods have been found disadvantageous insofar as the amount of necessary welding is concerned and particularly as respects the inferior quality of the so-called "stubbed-in" connection from the standpoint of efficiency of fluid flow within the header pipe to the branch line.

A simple form of connection for joining the end of a branch pipe to the wall of a header pipe comprises an essentially annular flange protruding outwardly from the curved wall of the header pipe and surrounding the opening in the pipe wall, such a flange lending itself to ready joinder to the end of a branch pipe by means of a simple circumferential weld. The formation of such a flange, however, presents problems in metal working, and past practice has been directed to hot forging such openings, necessarily involving time consuming and expensive forging procedures and resulting in undesirable inaccuracy in flange dimensions. The present invention concerns itself with a new and different approach to the problem of forming such annular flanges in pipe walls and at the same time avoiding complex hot forging procedures, inasmuch as the invention relates to a novel press capable of readily cold extruding such flanges in a very simple manner, there being to my knowledge no prior devices capable of forming pipe flanges with the ease and accuracy demonstrated by the present apparatus.

In accordance with the invention, the press is provided with a die containing a through opening and having surfaces forming a concave recess intersecting the opening at one side of the die for supporting the pipe with a precut hole therein centered over the die opening. The surface of the die includes a flange forming portion over which the pipe flange is to be drawn, the forming portion extending about the opening at its entrance and preferably having convex structure in the drawing direction for shaping the pipe flange.

The press also includes a movable mandrel assembly including a rod extending through the die opening and a hardened punch removably connected to the free end of the rod opposite the entrance to the die opening, the punch being separately insertible into the pipe and connectible to the rod end projecting into the interior of the pipe through the pre-cut hole therein. For shaping the flange during press operation, the punch has a bowl-shaped convex periphery sized for interfering contact with the interior wall of the pipe surrounding the hole and for travel toward and into the die opening in diminishing spaced relation to the forming surface portion of the die.

Actual forming of the flange involves uniform withdrawal of the punch through the hole in the pipe and into the die opening to progressively draw or cold extrude the pipe wall outwardly relative to the pipe and between the punch and the forming surface of the die in the manner to be described, resulting in the formation of a cold worked flange having improved strength and other mechanical properties, superior finish, and high dimensional accuracy. For this purpose, the press is provided with a pair of hydraulic cylinders mounted in parallel, a suitable cross-head connecting the mandrel assembly to hydraulically movable plungers contained by the cylinders.

Other features of the invention concern the provision of suitable devices for returning the mandrel assembly to its original position, a particularly useful construction of the punch adapting it for ready connection to the mandrel rod and for disassembly, and guide structure for centering the mandrel assembly during displacement thereof.

Other features and objects of the invention, as well as the details of an illustrative embodiment, will be more fully understood from the following detailed description of the drawings, in which:

Fig. 1 is a frontal elevation illustrating the complete press assembly;

Fig. 2 is a vertical sectional elevation taken on line 2—2 of Fig. 1;

Fig. 7 is a perspective view of a pipe after flanges have been formed thereon; and Fig. 8 is an enlarged perspective view of the die forming a part of the press.

Figure 3:
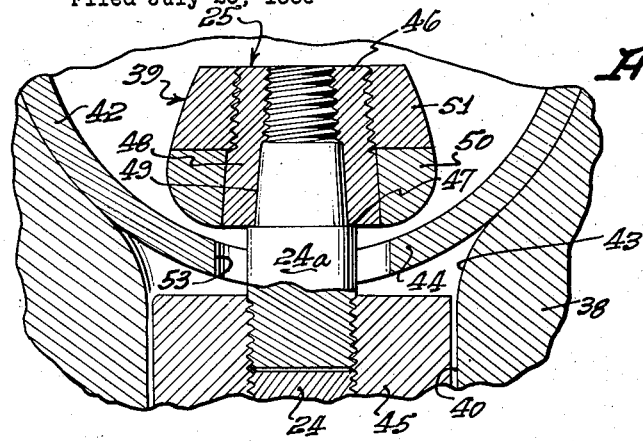
Fig. 3 is an enlarged fragmentary view taken in section illustrating portions of the mandrel assembly, die and pipe at the beginning of the flanging operation.

Referring first to Figs. 1 and 2 in which the complete press assembly 10 is illustrated, a frame including a floor plate 11, top plate 12, vertical end plates 13 and rear plate 113 mounts the working elements of the press assembly. The latter include a pair of hydraulic cylinders 14 abutting top plate 12 in laterally spaced parallel relation and having their lower ends closed and joined together structurally by support plate 15, which itself is suitably held to upper plate 12 by tie rods 115. Each of the cylinders contains a plunger and piston assembly 16 shown in broken lines to be slidably received within the cylinder bore, the lower ends of the plungers protruding from plate 15 and being connected by a transverse cross-head 17. In addition, the cylinders have hydraulic inlets 18, and drainage outlets 19, the inlets 18 serving the dual purpose of passing pressurized hydraulic fluid to the plungers 16 to displace them downwardly, and passing hydraulic fluid from the cylinders during the return strokes of the plungers.

Suitable pneumatic cylinders 20 mounted on floor plate 11 and having pneumatically actuated plungers 21 connected to opposite ends of the cross-head 17 are provided for retracting the cross-head in an upward direction upon completion of the working down-stroke thereof. For safety purposes, an elastomeric cushion 22 is centrally apertured to receive the heavy nut 23 and washer 123 connecting lower end of rod 24 of the mandrel assembly 25 to the cross-head so that the latter may impact the top of the cushion 22.

Figure 6:
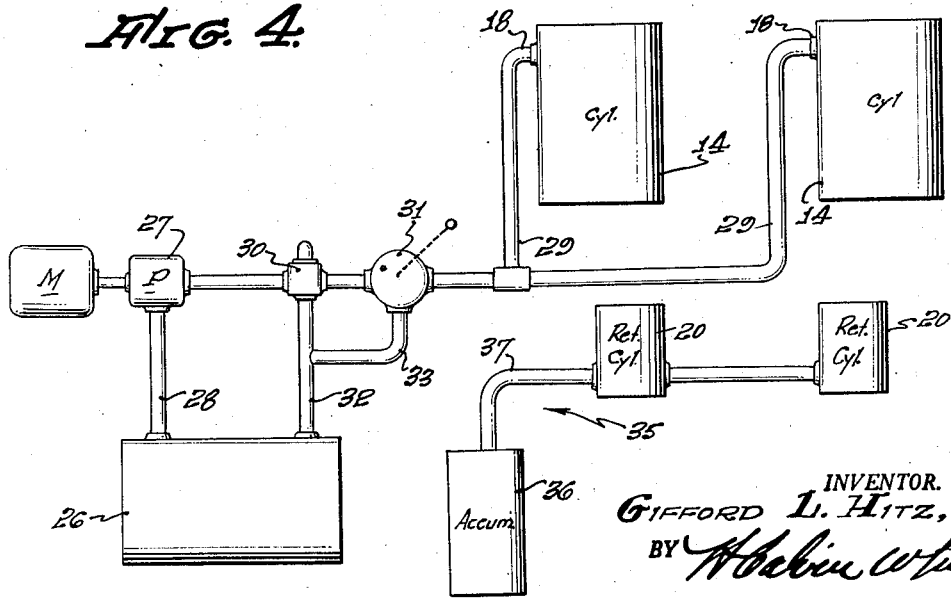
Fig. 6 illustrates the hydraulic and pneumatic systems for actuation of the press.

Referring briefly to Fig. 6, the hydraulic system for actuating the plungers 16 contained in cylinders 14 includes a fluid reservoir 26 from which fluid is drawn by a motor-driven hydraulic pump 27 through intake pipe 28. The pump discharges through suitably series-connected pressure relief valve 30 and control valve 31 and into a line 29 connected with the cylinder inlets 18, a suitable by-pass duct 32 connecting valve 30 with the reservoir and another by-pass line 33 connecting the control valve with line 32. Valve 30 serves the usual purpose of discharging to the reservoir when the head developed by pump 27 exceeds a predetermined amount, while operator controlled valve 31 serves to connect the hydraulic cylinders 14 either with the discharge of pump 27 as during operation of the press, or with the reservoir 26 as during fluid discharge from the cylinders. Also shown in Fig. 6 is the pneumatic system 35 for returning the mandrel assembly to its original position after the down-stroke of the plungers 16. System 35 comprises an air pressure accumulator 36 which may be maintained at operating pressure by a pump, not shown, the accumulator being connected by piping 37 to pneumatic cylinders 20, so that air pressure in the cylinders is maintained substantially constant to uniformly resist downward displacement of the cross-head 17, the mandrel assembly 25 and plungers 16.

Coming now to a description of the actual flange forming components of the press assembly shown in Figs. 1, 3 through 5 and 8, these components include a die 38 and a punch assembly 39 adapted to be drawn through cylindrical opening 40 formed in the die and extending in the direction of rod 24. Opening 40 intersects a concave recess formed in the die at right angles to the opening by upper concave die surface 41, which is adapted to support the pipe 42 with a pre-cut hole therein centered over opening 40, as better shown in Figs. 3 through 5. Since the die is seated upon the upper plate 12 of the press and held in position by bolts extending through die holes 140, pipe 42 is adapted to extend horizontally as supported by the die surface 41 during the flanging operation.

Figure 4:
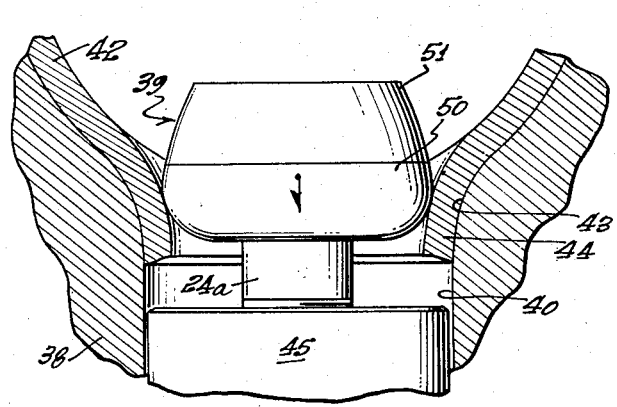
Fig. 4 is a view similar to Fig. 3 showing the positions of the mandrel assembly, die and pipe during the flanging operation.
Figure 5:
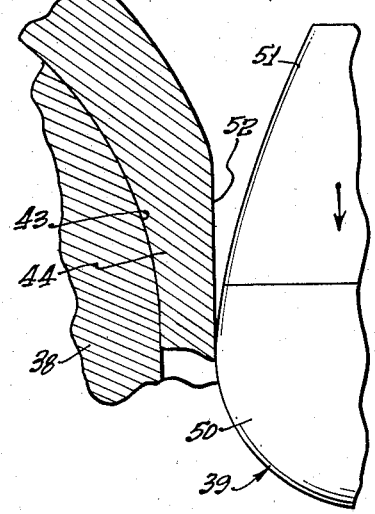
Fig. 5 is an enlarged fragmentary view of the die, punch and flange being formed therebetween.

The die surface 41 includes a forming portion 43 extending about and sloped toward the opening 41 at the entrance thereto, portion 43 having a convex curvature in the direction of the axis of opening 40. As shown in Figs. 4 and 5, forming portion 43 of the die seats and shapes the outer surface of the pipe flange 44 during the extruding operation, and for this purpose portion 43 should be pre-hardened to prevent galling.

The punch assembly 39 is shown in Fig. 3 to be removably connected to the upper end of rod extension 24a, the lower end of the latter being threadedly connected into guide sleeve 45 as is the upper end of rod 24. The sleeve is dimensioned for a slip fit in die opening 40 and opening 141 in plate 12 in order to accurately guide displacement of the mandrel assembly in an axial direction during flange extrusion. Returning to the description of the punch assembly 39, it includes a tapered sleeve 46 having inner threads for connection to the threaded upper end of rod extension 24a, the lower end of the annular sleeve seating on a shoulder 47 formed on the rod extension. The sleeve also includes a frustum portion 48 seated on tapered section 49 of the rod extension, the outer surface of sleeve portion 48 being tapered to seat a hardened ring 50. The latter is held in position by nut 51 threaded on the upper portion of the sleeve 46 and tightened against the ring. The outer surfaces of the ring and nut are shown to be bowl-shaped and to have a convex curvature in planes passing through the principal axis of the punch assembly. Furthermore, the ring 50 has a maximum transverse diameter greater than the diameter of any portion of the nut 51 so that the surface of the ring alone engages and forms the inner surface 52 of the flange during extrusion thereof, the nut serving merely to hold the ring in seated position on the sleeve.

Dimensionally, the maximum outer diameter of the ring 50 is smaller than the minimum inner diameter of opening 40, and at the same time is large enough to engage and draw the pipe flange 44 into the opening 40 and over the forming portion 43 of the die surface, with consequent reduction in the thickness of the flange. An inspection of Figs. 3 through 5 illustrates that as the punch assembly is drawn toward and into opening 40, the spacing between the convex surface of the ring 50 and the convex forming portion 43 of the die surface continuously diminishes until the ring is fully within the cylindrical portion of opening 40 as illustrated in Fig. 5. As a result, pipe flange 44 is truly extruded in the sense that flange metal is physically displaced in the direction of withdrawal of the punch assembly into the opening 40, the flange being cold worked and at the same time hardened due to such cold working, dimensional accuracy of the extruded flange being maintained by guided movement of the punch assembly toward and into the opening.

In order to prevent extreme galling of the pipe flange and the hardened surfaces of the punch assembly 39 and the forming portion 43 of the die during flange extrusion, the surfaces of the pipe wall subject to extrusion should first be cleaned and treated with a lubricant or lubricants, preferably comprising a dry type phosphate lubricant such as zinc phosphate sold under the trade-name "Oakite Cryscote HC." A grease type lubricant applied to the external surfaces of the punch assembly and the forming portion 43 of the die serves in conjunction with the phosphate coating on the pipe wall to effectively eliminate galling and to promote ease of flange extrusion and drawing of the mandrel assembly toward and into the opening during such extrusion.

A typical flange extruding operation involves grease lubrication of the punch assembly and die surfaces, and phosphate lubrication of the pipe wall surfaces surrounding the pre-cut opening therein, after which the pipe is positioned upon the die surface 41 with the pre-cut hole 53 in the pipe wall centered over the die opening 40, and with the rod extension 24a extending through the hole 53 of the pipe and into the interior of the pipe. Next, the punch assembly 39 including the sleeve 48 with the ring and nut mounted thereon is conveniently inserted through the end of the pipe and threaded onto the free end of the rod extension 24a projecting into the pipe interior. The press is then cycled as by control valve 31 to admit pressurized hydraulic fluid to the cylinders 14 and to uniformly displace the mandrel assembly 25 downward against the pneumatic pressure in retracting cylinders 20.

As the punch assembly moves toward opening 40 in the die, the hardened and lubricated annular surface of the ring 50 engages the phosphated inner surface of the pipe wall surrounding hole 53 and displaces the pipe wall downwardly in the manner shown in Fig. 4 of the drawings. Continued travel of the punch assembly in diminishing spaced relation to the forming surface portion 43 of the die effects cold extrusion of the pipe wall forming the flange shown in Figs. 4 and 5 to have diminished thickness resulting from cold working displacement of the metal in the flange in the direction of punch travel. Lubrication of the surfaces of the punch assembly, die and flange acts to ease and promote the extrusion operation to the extent that formation of the flange takes place uniformly and with moderate mandrel assembly displacement velocity. After flange formation, the pipe 42 may be removed from the die and valve 31 thrown to return the mandrel assembly to its original position. The punch assembly 39 may then be removed from the end of the rod extension 24a for further use during a subsequent flanging operation. A pair of finished flanges 44 typically formed on a pipe 42 are shown in Fig. 7, it being apparent that the ends of branch pipes may be readily connected to the flanges as by a simple circumferential weld, after the flange ends have been finish machined.

I claim:

1. An improved movable mandrel, comprising an assembly including a rod adapted to extend axially within a die through opening and into a recess sunk in the die and a punch removably connected to the free end of said rod, said punch including a tapered sleeve in threaded interengagement with the end portion of the rod, a hardened ring seated on said sleeve and a nut threaded on the sleeve and tightened against the ring, said ring having a convex periphery for facing a convex forming portion of the die surface and being sized for travel toward and into said die opening in diminishing spaced relation to said forming portion and for interfering contact with the inside of a pipe wall received in the die recess during punch travel into said hole to bend the pipe wall into engagement with said die forming portion and thereafter extrude the pipe wall metal in the direction of punch travel reducing the wall thickness and cold working the metal throughout said reduced thickness as the flange is progressively formed between said punch and die forming portion.

2. An improved movable mandrel, comprising an assembly including a rod adapted to extend axially within a die through opening and into a recess sunk in the die and a punch removably connected to the free end of said rod, said punch including a hardened ring extending about the rod and threaded means including a tapered sleeve removable from the rod rigidly connecting the ring to the rod and centering the ring in coaxial alignment with the rod, said ring having a convex periphery for facing a convex forming portion of the die surface and being sized for travel toward and into said die opening in diminishing spaced relation to said forming portion and for interfering contact with the inside of a pipe wall received in the die recess during punch travel into said hole to bend the pipe wall into engagement with said die forming portion and thereafter extrude the pipe wall metal in the direction of punch travel reducing the wall thickness and cold working the metal throughout said reduced thickness as the flange is progressively formed between said punch and die forming portion.

3. The invention as defined in claim 2 in which the rod end portion is tapered to seat the punch and said taper is threaded throughout only a portion of the length thereof for rapid assembly of said punch on said rod end.

4. The invention as defined in claim 2 including another sleeve mounted on the rod in spaced relation to the punch for forming a slip fit with the die within said opening therein for axially guiding the rod.

5. An improved movable mandrel, comprising an assembly including a rod adapted to extend axially within a die through opening and into a recess sunk in the die and a punch removably connected to the free end of said rod, said punch including a hardened ring extending about the rod and threaded means including a sleeve quickly removable from the rod rigidly mounting the ring on the rod, said sleeve and rod having interengaged threads tapering throughout their extent and toward the end of the rod, said ring having a convex periphery for facing a convex forming portion of the die surface and being sized for travel toward and into said die opening in diminishing spaced relation to said forming portion and for interfering contact with the inside of a pipe wall received in the die recess during punch travel into said hole to bend the pipe wall into engagement with said die forming portion and thereafter extrude the pipe wall metal in the direction of punch travel reducing the wall thickness and cold working the metal throughout said reduced thickness as the flange is progressively formed between said punch and die forming portion.

References Cited in the file of this patent

UNITED STATES PATENTS

| 223,896 | Bray | Feb. 3, 1880 |
| 235,501 | Bray | Dec. 14, 1880 |
| 424,213 | Kellogg | Mar. 25, 1890 |
| 945,932 | Gardiner | Jan. 11, 1910 |
| 1,463,799 | Cockburn | Aug. 7, 1923 |
| 1,656,736 | Kellogg | Jan. 17, 1928 |
| 1,950,938 | Dunn | Mar. 13, 1934 |
| 1,951,078 | Wright et al. | Mar. 13, 1934 |
| 1,951,087 | Dunn | Mar. 13, 1934 |
| 2,105,241 | Gazey | Jan. 11, 1938 |
| 2,213,574 | Weston | Sept. 3, 1940 |
| 2,507,859 | Keller | May 16, 1950 |
| 2,511,836 | Cullen | June 20, 1950 |

FOREIGN PATENTS

| 22,247 | Great Britain | Oct. 7, 1896 |